Oct. 27, 1970  H. P. OLMO ET AL  3,535,856
METHOD OF TREATING A GROWING CROP
Original Filed Jan. 11, 1967  3 Sheets-Sheet 1

INVENTORS
HAROLD P. OLMO
HENRY E. STUDER

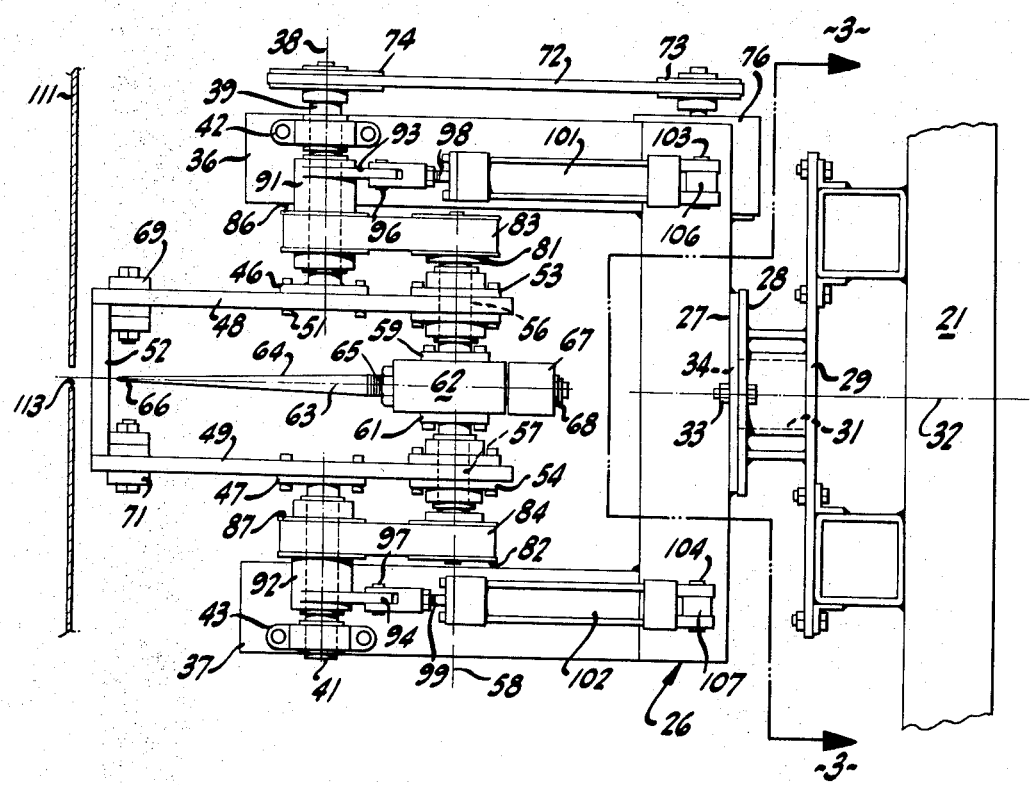
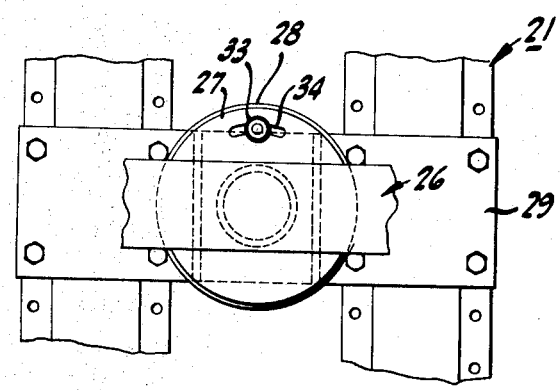

INVENTORS
HAROLD P. OLMO
HENRY E. STUDER

United States Patent Office 3,535,856
Patented Oct. 27, 1970

1

3,535,856
METHOD OF TREATING A GROWING CROP
Harold P. Olmo and Henry E. Studer, Davis, Calif., assignors to The Regents of the University of California, Berkeley, Calif.
Application Jan. 11, 1967, Ser. No. 608,573, now Patent No. 3,492,801, which is a continuation-in-part of application Ser. No. 514,049, Dec. 15, 1965. Divided and this application Jan. 15, 1969, Ser. No. 821,529
Int. Cl. A01g 19/00
U.S. Cl. 56—1                          5 Claims

ABSTRACT OF THE DISCLOSURE

A fruiting cane, selected from grape vine shoots specially cultivated the preceding year, is trained on a horizontal wire. The growing grape bunches depend therefrom. The cane is severed from the vine several days prior to harvest. A machine travelling along the fruiting cane has a transversely disposed, circularly moving baton that appears through an upright slot in a vertical shield adjacent the fruiting cane, travels upwardly and abruptly strikes the wire or severed fruiting cane and disappears behind the shield. The baton blows detach the partially dried grapes and they fall into a receiver.

---

This application is a division of our application Ser. No. 608,573, now Pat. 3,492,801, filed Jan. 11, 1967, which in turn is a continuation-in-part of our application Ser. No. 514,049, now Pat. 3,490,217, filed Dec. 15, 1965.

In the cultivation of grapes for harvest on a widespread or commercial scale there is a distinct need, whether the grapes are to be dried as raisins or are to be retrieved for crushing, for getting the bunches and grape berries from the vines with minimum use of hand labor. There is also a need for retrieving the grapes in a condition so that they can readily be handled without substantial deterioration or spoilage. There is also a general need for improved growing and harvesting of grapes.

It is therefore an object of my invention to provide a method of growing and harvesting grapes and a mechanism for doing so to reduce the amount of hand labor required.

Another object of the invention is to provide a method of harvesting grapes, involving severing the fruiting canes from the vine, in a fashion to assist in retrieving the grapes in a satisfactory condition.

Another object of the invention is to provide a method of growing grapes so that they are well adapted to machine harvest.

A further object of the invention is to provide a method of growing grapes which exposes the grape bunches for ready harvest and does not injure the vines.

Another object of the invention is to provide a machine which can be advanced in a field in which grapes are growing and which will readily detach the fruit from the vines without becoming entangled in the vines or having its progress impeded.

A further object of the invention is to provide a machine for harvesting grapes in which an abrupt acceleration of the vine is accomplished by a portion of the machine which is readily advanced toward and retracted from the vine.

Other objects together with the foregoing are attained in the practice of the method pursuant to the invention and in a form of the machine pursuant to the invention as set forth in the accompanying description and as illustrated in the accompanying drawings, in which:

FIG. 1 is a diagrammatic showing, largely in isometric perspective, of a portion of a vineyard in which the grape

2 harvesting method is practiced in part by a machine having portions shown in block form;

FIG. 2 is a plan of a portion of the harvesting machine disclosed in FIG. 1;

FIG. 3 is a cross section, the planes of which are indicated by the lines 3—3 of FIG. 2;

Figure 1:
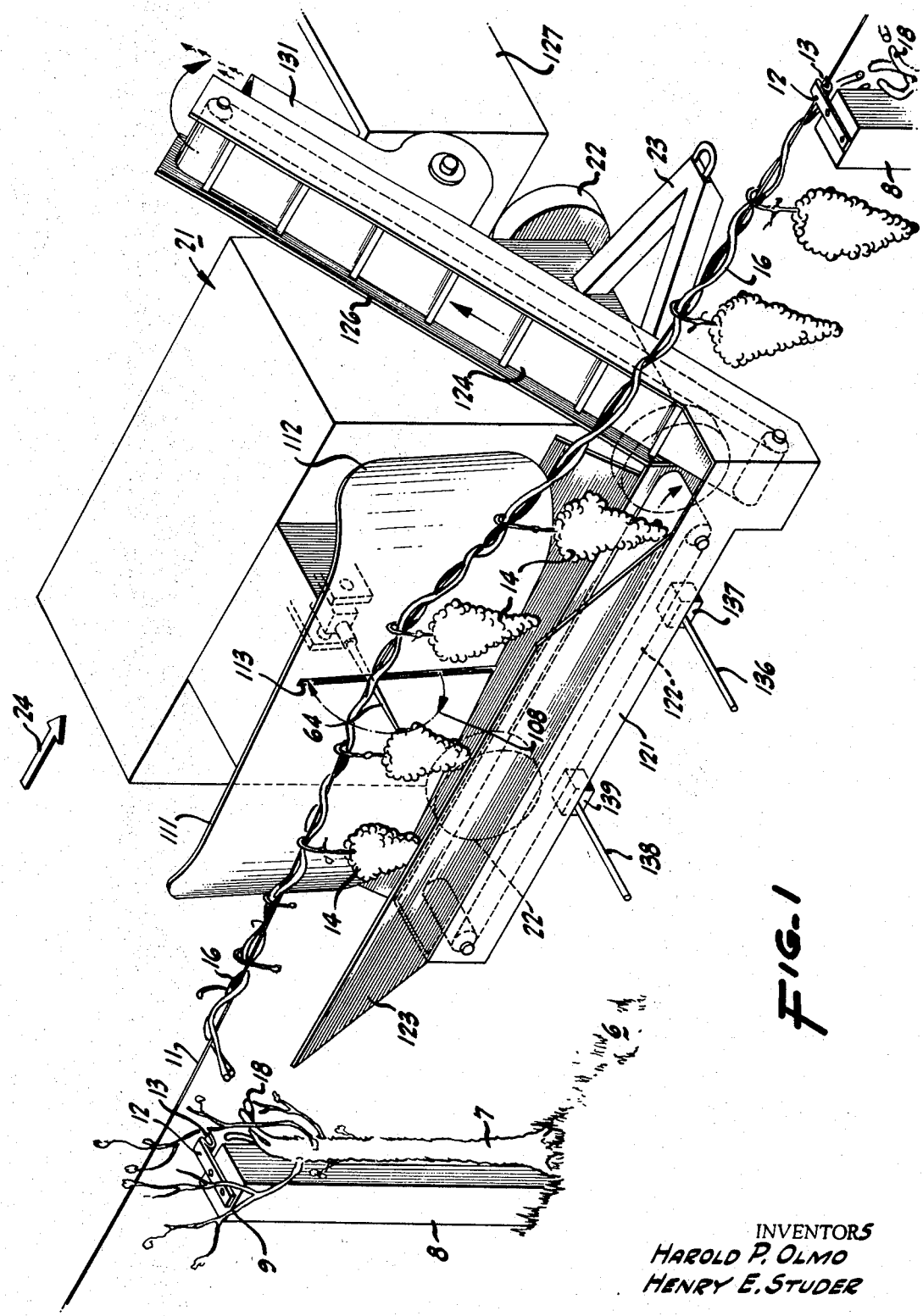

As partly disclosed in our application Ser. No 514,049, we preferably employ our method and machine in connection with the harvesting of grapes which, for example, grow in a field or vineyard 6 in which an individual one of many grape vines 7 is trained to grow alongside one of a row of posts 8. The vine 7 during one season is particularly trained to afford a number of new shoots 9 for use in the succeeding season. The shoots 9 are restricted to any desired number, usually four or so, and are permitted to grow generally upwardly and outwardly from the vine 7. During a part of the culture season the shoots are stripped of any blossoms and excess fruiting material. This is sometimes accomplished by removing the flowers and also may be accomplished by treating them with chemicals so that they do not develop. During this growing season the shoots 9 are simply allowed to develop and extend themselves without in any way producing any fruit.

During the next season, some of these shoots from the preceding season are curved and bent to lie alongside and be twined around or fastened to a horizontal trellis wire 11. In some instances the post 8 carries a cross arm at the top to support wires on either side of the post. That can be done in accordance with our method, but in the present instance we prefer simply to provide the post with a support 12 having a horizontally opening hook 13 thereon in which the wire 11 customarily is suppported. The various posts 8 are sufficiently close together so that the wire 11 can readily be strung from one to the other. When the vines have substantially developed, the support is enough to avoid undue sagging of the wire and the vine or vines trained therealong.

The shoots trained along the wire 11 are preferably those growing adjacent the top of the vine 7 and are conveniently directed in one or both directions away from the post 8. As the shoots develop, they become fruiting canes 16 having foliage. They ultimately develop clusters or bunches of grapes 14. These may start in random directions around the fruiting canes 16, but as they develop and get heavier the bunches tend to hang straight downwardly by gravity substantially as shown.

At about the time the grape clusters or bunches have developed and are ready for harvesting, the fruiting canes 16 are separated from the vine 7 by severing. This leaves the stubs 18 of the fruiting canes completely detached and distinct from the remainder of the canes 16. While it is possible immediately to harvest the grapes, we have found that for many uses, particularly for raisins and for crushing, it is beneficial to leave the severed fruiting canes in place on the wire and undisturbed for from one day to about seven days. During this time the grape berries themselves tend partially to dehydrate and to become somewhat less crisp or more resilient than usual so that they better withstand subsequent falling and handling. Also, the cap stem of each berry tends to dry slightly and partially to shrivel. The drying cap stem becomes quite weak and readily shatters under a substantial force, thus freeing the berry. The partial field dehydration of the berries, of the associated cap stems and of part of the fruiting canes also is beneficial in that simultaneous detachment of all of the fruit from the fruiting canes is enhanced.

As a suitable device for automatically detaching the partly dried berries and bunches from the fruiting canes, we provide a machine for advancement along the row in the vineyard; that is, alongside the fruiting canes in a generally horizontal direction. A suitable machine includes a carriage 21 supported on ground-engaging wheels 22. The carriage has a draft frame 23 for attachment to any suitable draft vehicle, such as a tractor, effective to advance the carriage 21 in the field 6 in the direction of the arrow 24.

The machine carriage has a supporting frame 26 of appropriate structural shapes and includes a mounting plate 27 bearing against a support plate 28 forming part of a side frame 29 of the carriage. The plates 27 and 28 are held in thrust relationship by a central pivot pin 31 allowing limited rotation about a transversely extending axis 32. Any selected orientation of the plate 27 and so of the support frame 26 with respect to the carriage frame 21 is arranged by pivoting the plate 27 about the axis 32. The plates 27 and 28 are then locked in position by use of a clamp bolt 33 fixed in the plate 28 and extending through an arcuate slot 34 in the plate 27.

The supporting frame 26 has a pair of transversely extending arms 36 and 37. On the arms and in alignment on a longitudinally extending axis 38 is a pair of drive shafts 39 and 41 mounted in journals 42 and 43 so that the shafts 39 and 41 can rotate about the axis 38. The adjacent ends of the shafts 39 and 41 terminate in disks 46 and 47 to which diametrically extending crank plates 48 and 49 are secured by bolts 51. The plates 48 and 49 at one end are joined by a cross member 52 and at the other end carry journals 53 and 54. The crank plates 48 and 49 with their associated structure constitute a baton frame.

Mounted in the journals 53 and 54 are baton shafts 56 and 57 aligned on a baton axis 58 parallel with the axis 38. The adjacent ends of the baton shafts are provided with securing plates 59 and 61 secured to a central, baton block 62. Extending through the block 62, usually along a generally transverse axis 63, is a baton 64. This is preferably a rod threaded into the block 62 and locked in adjusted position by a jam nut 65. The baton 64 is preferably tapered from a position adjacent the jam nut 65 to its outer end 66. On the part of the baton extending from the other side of the block 62 there is threaded a counterweight 67. This can be radially adjusted and finally locked in position by a jam nut 68. The baton thus is balanced about the baton axis 58.

The baton frame and some connected parts are counterbalanced about the axis 38 not only by the cross bar 52 but also by counterweights 69 and 71 on the plates 48 and 49. The connected shafts 39 and 41 are simultaneously rotated by a drive belt 72 entrained about a pulley 74 on the shaft and also around a pulley 73 on a drive motor 76 appropriately mounted on the frame 26. When the motor 76 is energized, the pulleys 73 and 74 are revolved and the entire baton frame is rotated in balanced condition about the axis 38.

Means are particularly provided for moving the baton in a path so that the baton is always parallel to itself. That is, any point on the baton moves in a circle. Furthermore, the baton is provided with means for establishing a selected orientation in any one of a number of polar positions. For that reason, the baton shafts 56 and 57 at their outer ends carry planet gears 81 and 82 fast to the shafts and concentric with the axis 58. The planet gears are contoured to engage with timing belts 83 and 84 also encompassing appropriately contoured sun gears 86 and 87 journalled on the shafts 39 and 41 so as to be concentric with the axis 38. The sun gears are of the same pitch diameter as the planet gears 81 and 82.

Figure 4:
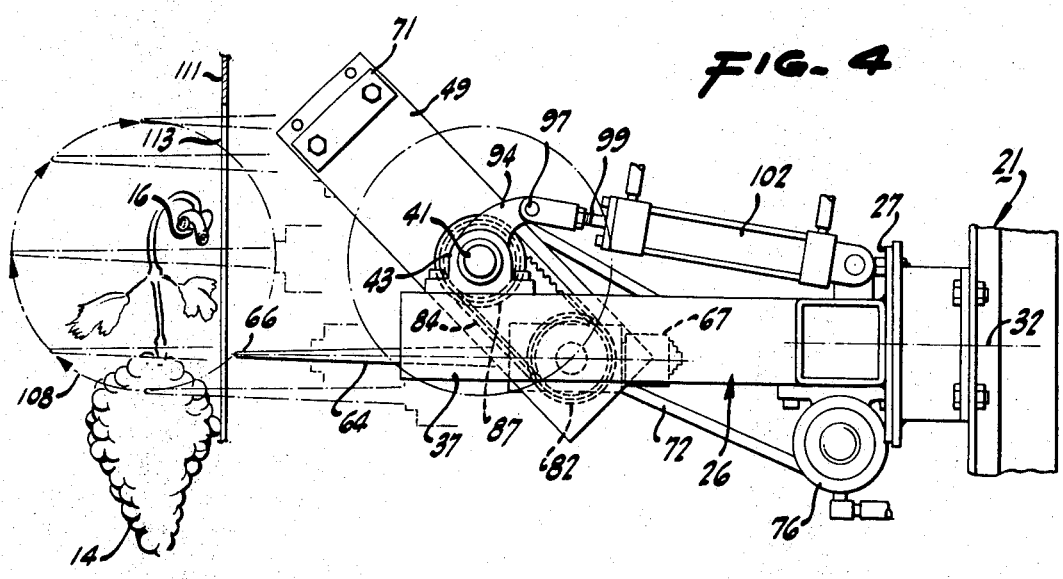
FIG. 4 is a side elevation of a portion of the machine as shown in FIG. 2, the structure being oriented to produce projection of the baton mechanism.
Figure 5:
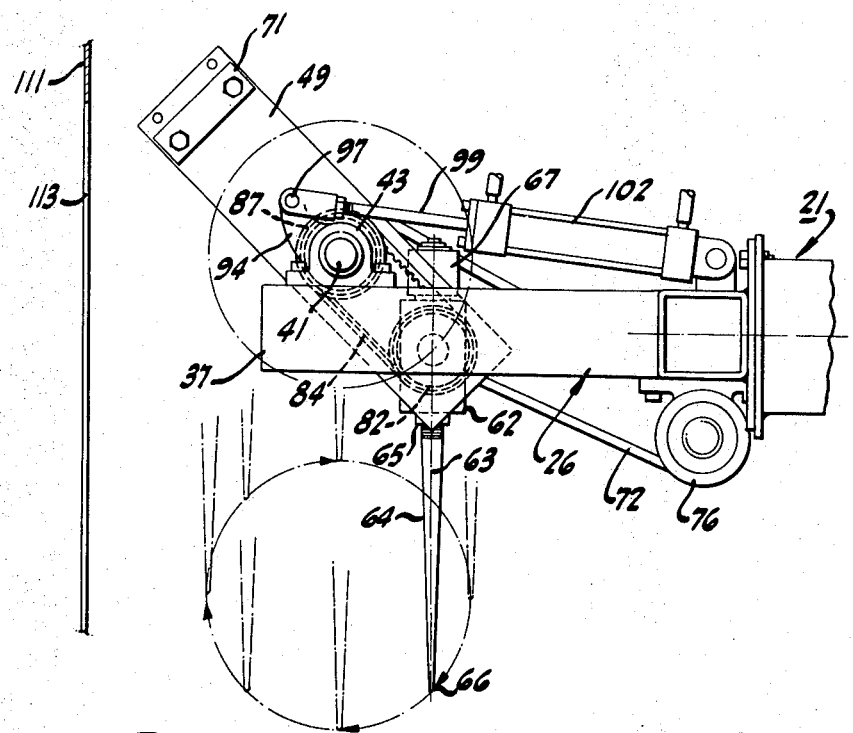
FIG. 5 is a view similar to FIG. 4 but showing the mechanism arranged for operation of the baton in a retracted position.

The sun gears 86 and 87 are fast on hubs 91 and 92 from which radial torque arms 93 and 94 extend. Connected by pivot pins 96 and 97 to the arms are piston rods 98 and 99 of a pair of hydraulic cylinders 101 and 102 hydraulically connected in parallel. Pivots 103 and 104 join the cylinders to brackets 106 and 107 upstanding from the frame arms 36 and 37. The arms 93 and 94 are thus held by the hydraulic mechanisms 101 and 102 in any set position of orientation around the axis 38 between relatively wide limits; for example, between limits ninety degrees apart. In one position of the baton structure, particularly as shown in FIG. 5, the mechanism rotates with the baton 64 so oriented that the baton is disposed approximately vertically and does not project laterally beyond the rotational path of the frame plates 48 and 49. In another condition of the structure as shown in FIG. 4, when the hydraulic members 101 and 102 are in their other extreme position, the sun gears 86 and 87 are rotated about ninety degrees around the axis 38 and this, through the interconnection of the timing belts 83 and 84, moves the baton 63 into a generally horizontal position. The baton then projects laterally beyond the frame plates 48 and 49 as it rotates.

When the motor 76 is energized and the baton is horizontal, the baton moves in an arcuate path 108, as illustrated in FIG. 4, with a generally outward, upward and then inward movement. The baton excursion or projection is preferably of a sufficient extent so that the baton extends well into the growing vine structure. The vine is somewhat confined and positioned by a guard plate 111 or shield mounted on the supporting frame 26 and extending in a longitudinal fore and aft direction, the plane of the plate 111 being generally vertical. The leading portion of the guard plate 111 is preferably shaped to afford a curved nose 112 so that as the carriage advances, the projecting portions of the vine tend to rest against and be confined by the plate 111. The plate extends ahead of and behind the baton and has a slot 113 to pass the baton. In the normal setting of the machine, the slot 113 is inclined somewhat by rocking the plate 27 with respect to the plate 28. As the carriage 21 advances, the actual direction of motion of the baton is inclined to the vertical but affords in effect a vertical contact with the grape vine.

In the operation of this structure, it is preferred to start sometime after the fruiting canes 16 have been severed and to arrange the machine to travel alongside the wire with the shield or guard plate 111 crowded well into the vine. Also, the vine itself is preferably brought out from the supporting bracket 12 so that it extends freely and some distance away from its growing location next to the post 8. The severed fruiting canes are easily moved, with the wire, through the requisite distance. This change in cane location is for the purpose of disposing the grape clusters above a receiving trough 121 on the carriage 21 and having a belt convevyor 122 therein. A trough side 123 lies under the grapes to direct them toward the conveyor belt 122. From one end of the conveyor belt an elevator conveyor belt 124 on an inclined frame 126 extends transversely across the machine to an appropriate receiving receptacle 127.

After positioning of the machine and removal of the wire 11 and the fruiting canes from the supporting hooks, the machine advances as the rapidly operating baton repeatedly moves outwardly and upwardly to strike the wire 11 and particularly the fruiting canes 16. These are lifted or moved in an upward direction before the baton then retracts through the slot and behind the shield. The baton thus gives repeated blows against the wire and vine, tending to accelerate the wire and vine upwardly very quickly. The amount of upward baton travel is sufficient to take care of the usual amount of sag of the loaded wire. The grapes and the clusters have been partially dried and the cap stems are quite weak because of the dehydration following severing of the fruiting canes. The baton blows thus readily dislodge the grapes, almost all of which detach as individuals and fall easily into the trough and travel along the belt 122. Some clusters, stems and leaves also are dislodged and fall. All of these are transmitted on the conveyor 124. If desired, a blower mechanism 131 can be furnished to discharge a draft of air under the end of the conveyor 124 to blow leaves and trash away. The heavier grapes or clusters fall directly into the receiving bin 127. Under some circumstances, the discharged material is not put into a separate container 127, but is deposited directly onto a strip of paper or comparable material directly on the ground to continue drying as raisins as disclosed in our copending application.

Following the operation of the baton, the wire and attached defruited canes are permitted to fall and the wire is subsequently reconditioned and replaced for the next year's operation.

It is advisable in some instances, particularly where but a single wire is used close to the post 8, to provide means for retracting the baton when the baton is near the post. For that reason, we provide on the frame an advance sensing finger 136. When this finger 136 comes into contact with the post 8, it operates a control 137 so that both of the cylinders 101 and 102 are actuated to move the baton from the position shown in FIG. 4 into the inactive position shown in FIG. 5. The shield 111 thus can go by the post without any difficulty. A trailing sensing finger 138 subsequently contacts the post 8 and operates a sensing device 139 for reactivating the cylinders 101 and 102 and restoring the baton to its projecting path of movement.

It is also possible, with a similar arrangement of the fruiting canes but without severing them, to harvest the grapes with the same machine. This usually detaches the grapes in clusters or bunches with only a small number of separate grapes.

What is claimed is:

1. A method of harvesting grapes comprising supporting a fruiting cane in substantially a horizontal position, and repeatedly striking said fruiting cane with successive blows, each of said blows constituting an abrupt strike upon said fruiting cane from below and said successive blows being separated by intervening impact-free periods and said successive blows being delivered at points spaced along the length of said fruiting cane.

2. A method as in claim 1 including the step of partially dehydrating only the fruit and adjacent parts of said fruiting cane prior to said striking step.

3. A method as in claim 1 including the step of severing said fruiting cane from its vine prior to striking said fruiting cane.

4. A method as in claim 3 in which said severing step is performed from about one to seven days before striking said fruiting cane.

5. A method of harvesting grapes as in claim 1 in which said fruiting cane is grown along and supported in said horizontal position on a horizontal wire and in which said striking step is abrupt and bodily jerks said fruiting cane and said wire upwardly together whereby grapes on said fruiting cane are detached therefrom.

References Cited

UNITED STATES PATENTS 3,371,473 3/1968 Burton _____ 56—330
3,380,236 4/1968 Shepardson _____ 56—330

OTHER REFERENCES

Commercial Fruit and Vegetable Products; W. V. Cruess, 3rd ed. 1948, pp. 484–491, McGraw-Hill.

The Chemistry and Technology of Food, 2nd ed., M. B. Jacobs, vol. III, 1951, pp. 1799–1802, Interscience Publishers.

RUSSELL R. KINSEY, Primary Examiner

U.S. Cl. X.R.

56—330